United States Patent
Tiwari et al.

(10) Patent No.: US 9,477,214 B2
(45) Date of Patent: Oct. 25, 2016

(54) PLANT CONTROL SYSTEMS AND METHODS

(71) Applicant: General Electric Company, Schenectady, NY (US)

(72) Inventors: Awadesh Kumar Tiwari, Bangalore (IN); Mahesh Kumar Asati, Bangalore (IN); Raub Warfield Smith, Ballston Lake, NY (US); Achalesh Kumar Pandey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 13/789,548

(22) Filed: Mar. 7, 2013

(65) Prior Publication Data

US 2014/0257526 A1    Sep. 11, 2014

(51) Int. Cl.
G05B 13/02     (2006.01)
F01K 23/06     (2006.01)
F01K 23/10     (2006.01)

(52) U.S. Cl.
CPC ............. *G05B 13/02* (2013.01); *F01K 23/067* (2013.01); *F01K 23/101* (2013.01); *Y02E 20/16* (2013.01); *Y02E 20/18* (2013.01)

(58) Field of Classification Search
None
See application file for complete search history.

(56) References Cited

U.S. PATENT DOCUMENTS

| | | | |
|---|---|---|---|
| 6,490,506 B1* | 12/2002 | March | G05B 23/0283 290/43 |
| 2006/0178782 A1* | 8/2006 | Pechtl et al. | 700/286 |
| 2009/0012653 A1* | 1/2009 | Cheng et al. | 700/287 |
| 2010/0306001 A1* | 12/2010 | Discenzo et al. | 705/7 |
| 2011/0054965 A1* | 3/2011 | Katagiri | G06Q 10/063 705/7.11 |
| 2011/0066298 A1* | 3/2011 | Francino et al. | 700/290 |
| 2011/0245937 A1* | 10/2011 | Rawson et al. | 700/90 |
| 2014/0089055 A1* | 3/2014 | Smith | G06Q 10/0631 705/7.36 |
| 2014/0329159 A1* | 11/2014 | Ibuka | H01M 8/04223 429/423 |

* cited by examiner

*Primary Examiner* — Sean Shechtman
(74) *Attorney, Agent, or Firm* — Fletcher Yoder, P.C.

(57) ABSTRACT

Systems and methods provided herein. In one embodiment, a system includes an advisory system including a loss computation engine configured to derive a total system loss for an industrial plant based on a first sensor positioned in a first industrial plant component and on a first physical model of the first industrial plant component. The advisory system further includes a cost model configured to use a cost function to derive a cost based on the total system loss, and a control strategy system configured to derive an advisory report, a control correction factor, or a combination thereof, based on the cost, wherein a control system is configured to apply the control correction factor to control a process in the industrial plant.

19 Claims, 5 Drawing Sheets

PLANT CONTROL SYSTEMS AND METHODS

BACKGROUND OF THE INVENTION

The present disclosure relates to operations of an industrial plant, and more particularly to systems and methods for improving the operations of the industrial plant.

An industrial plant, such as a power generation plant, includes a plurality of interrelated equipment and processes. For example, power generation plants may include turbine systems and processes for operating and maintaining the turbine systems. During plant operations, the equipment and processes may encounter losses, such as power production system losses related to real world usage of machinery, machinery age, and so on, potentially affecting overall plant effectiveness. It would be beneficial to address such issues to improve plant performance.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an advisory system including a loss computation engine configured to derive a total system loss for an industrial plant based on a first sensor positioned in a first industrial plant component and on a first physical model of the first industrial plant component. The advisory system further includes a cost model configured to use a cost function to derive a cost based on the total system loss, and a control strategy system configured to derive an advisory report, a control correction factor, or a combination thereof, based on the cost, wherein a control system is configured to apply the control correction factor to control a process in the industrial plant.

In a second embodiment, a method includes creating a first component loss model configured to derive a first loss for a first component of an industrial plant, and building a second cost model configured to derive a second cost for operations of the second component by using the second loss. The method further includes combining the first and second cost models into a total cost model configured to derive a total cost based on a commercial input, and receiving a first data related to operations of the first component, and a second data related to operations of the second component. The method additionally includes computing the total loss using the first and second data as inputs to the total loss model.

In a third embodiment, a system includes a memory comprising a on-transitory, computer-readable medium comprising code configured to build a first cost model configured to derive a first cost for operations of the first component by using the first loss, and building a second cost model configured to derive a second cost for operations of the second component by using the second loss. The code further comprises code configured to combining the first and second cost models into a total cost model configured to derive a total cost based on a commercial input, and deriving the total cost.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
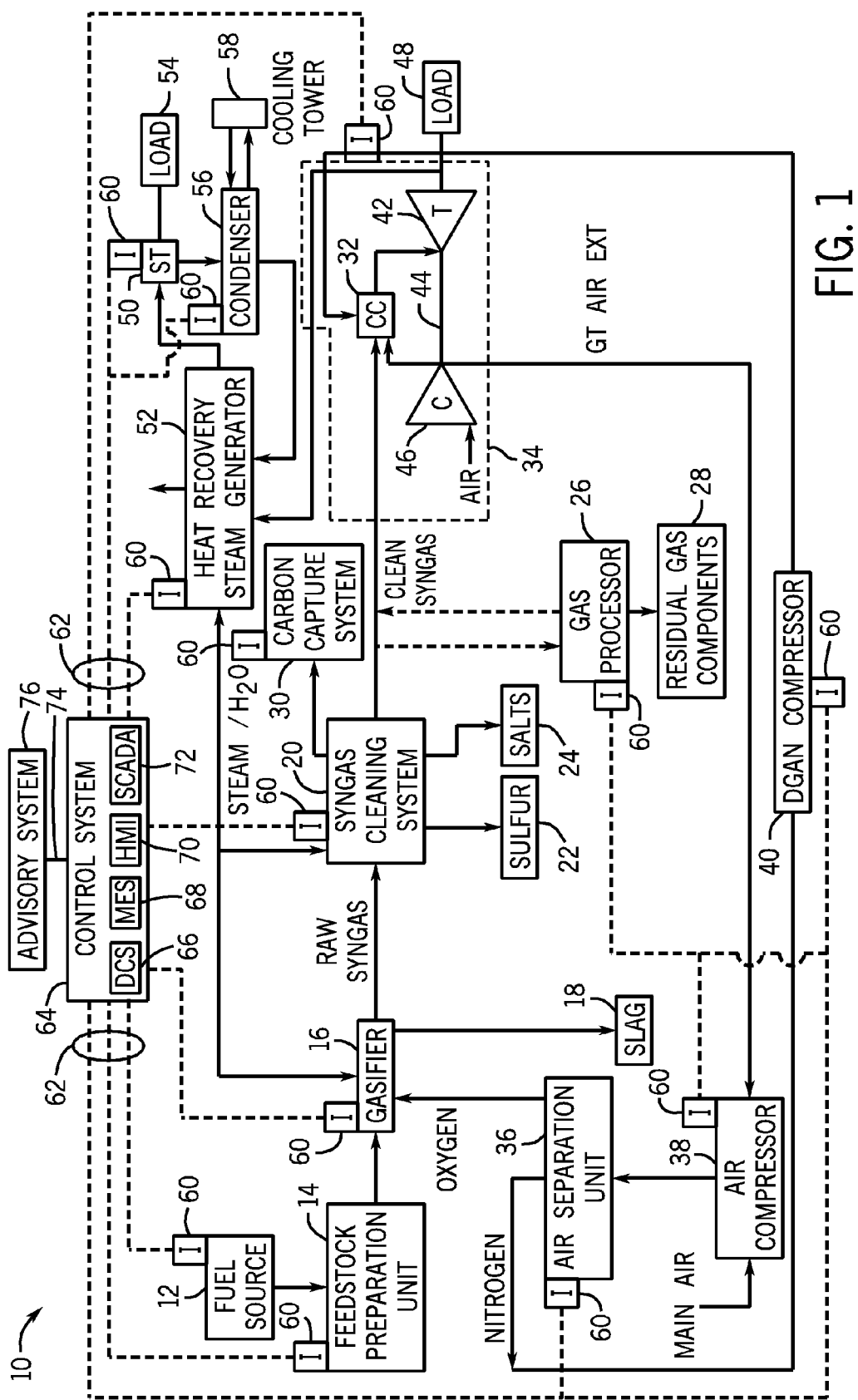
FIG. 1 illustrates an embodiment of a power plant having an advisory system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of industrial plants, including but not limited to power plants, chemical plants, manufacturing plants, oil refineries, and the like. Industrial plants may include a variety of equipment and processes useful in providing a variety of operations and services. For example, power plant equipment or machinery may provide operations suitable for producing power. Likewise, chemical processing machinery may provide operations useful in the manufacturing and/or processing of chemicals. Similarly, manufacturing machinery may provide operations suitable for making or otherwise reshaping physical items.

Industrial plants, such as power plants, may include many different components and processes. For example, the plants may include turbine systems, (e.g., gas turbines, steam turbines), electrical generators, heat recovery steam generation (HRSG) systems, gas treatment systems (e.g., acid gas removal systems), feedwater systems, condensers, cooling systems, mixers, boilers, furnaces, gasifiers, and so forth. The aforementioned systems may experience losses. That is, the systems may not be performing to a rated or baseline performance level. For example, the systems may not be producing a desired level of performance level due to aging, degradation, unplanned maintenance events, and other issues. The losses may include pressure losses, thermal losses, alignment losses, (e.g., due to misalignment between rotating and stationary components) vibration losses, leakage, wear and tear losses, undesired fuel quality losses, losses due to undesired operational parameters, losses due to planned or unplanned maintenance events, planned or unplanned events (e.g., offlining for inspection, weather) and so on. The losses may also be due to degradation, and measured by a comparison between a sensor reading and an International Organization for Standardization (ISO) rated value. The losses may occur during steady state operations or during transients (e.g., startup, shutdown, testing, trips). Losses for individual systems and components may be observed and predicted, and a total loss (observed or predicted) for the plant (or any system) may then be tabulated.

Accordingly, the techniques disclosed herein may address the impact of losses on plant performance by quantifying component and total losses and by using loss measures to provide control actions, advisory actions, and scheduling actions (e.g., scheduling of outage and/or maintenance actions) to improve plant performance. In one embodiment, the control actions may include automatic outage actions and/or online corrective actions, as described in more detail below. Alternatively or additionally, advisories may be issued to aid the plant operators in determining potential benefits and/or costs of performing certain plant operations, outage actions, and/or maintenance actions. Further, in power generation plants, the techniques disclosed herein may provide for the simulation and/or results of utilizing "reserve power" at both steady state and transient conditions. Additionally, economic inputs and a cost function may be used, suitable for deriving an economic cost of plant operations. The economic cost may then be used to more efficiently operate the plant as well as to provide visibility of true cost of operations.

To derive losses, empirical data may be analyzed from a variety of sensors, including pressure sensors, flow sensors, temperature sensors, clearance (e.g., difference between a rotary and stationary component) sensors, vibration sensors, speed sensors, emission sensors (e.g., carbon oxides, nitrogen oxides, sulfur oxides, and the like), combustion dynamics sensors, and the like. In addition to sensor data, the data may also include current plant data, historical plant data, technical and commercial data, environmental data, degradation data, optimization criteria, and so forth. Commercial data, for example, may be used to calculate plant parameters related to current quantity of desired power production based on market conditions. Further, federal regulations, code, and/or standards (e.g., industry standards) may be used to derive operational parameters such as emission levels, testing intervals, reporting methods, and so forth. Current plant data generally refers to data generated by the plant during plant operations that are subject to change over time. For example, data generated through the use of plant instrumentation such as sensor instrumentation may be current plant data. Historic plant data generally refers to stable data, including data determined during plant construction, plant configuration data, or records of past plant behavior and/or trends.

By using the systems and methods described herein, the abovementioned data may be combined and manipulated to build a plurality of loss-based models, including component-based loss-based models and total loss (e.g., plant loss) models, which may be used to derive information useful in improving plant operations. The loss-based models may include physics based models, statistical models, and heuristic models (e.g., artificial intelligence models) useful in predicting loss. For example, the physics-based models, statistical models, heuristic models, or a combination thereof, may predict an expected loss based on age of the component, type of component, maintenance of the component, and so on.

Turning now to the figures, FIG. 1 is a block diagram of an exemplary power plant 10 (e.g., integrated gasification combined cycle [IGCC]) configured to provide operational control and advisory actions. As illustrated, the power plant 10 is powered by a fuel source 12, such as a solid feed, which is used to generate a syngas. The fuel source 12 may include coal, petroleum coke, biomass, wood-based materials, agricultural wastes, tars, coke oven gas and asphalt, or other carbon containing items. The solid fuel of the fuel source 12 may be passed to a feedstock preparation unit 14. The feedstock preparation unit 14 may, for example, resize or reshape the fuel source 12 by chopping, crushing, milling, shredding, pulverizing, briquetting, or pelletizing the fuel source 12 to generate feedstock. Additionally, water, or other suitable liquids, may be added to the fuel source 12 in the feedstock preparation unit 14 to create slurry feedstock. In other embodiments, no liquid is added to the fuel source 12, thus yielding dry feedstock.

The feedstock may be passed to a gasifier 16 from the feedstock preparation unit 14. The gasifier 16 may convert the feedstock into a combination of carbon monoxide, carbon dioxide, water, and hydrogen, e.g., syngas. This conversion may be accomplished by subjecting the feedstock to a controlled amount of steam and oxygen at elevated pressures. The gasification process may include the feedstock undergoing a pyrolysis process, whereby the feedstock is heated, generating a solid, e.g., char, and residue gases, e.g., carbon monoxide, and hydrogen.

A combustion process may then occur in the gasifier 16. The combustion may include introducing oxygen to the char and residue gases. The char and residue gases may react with the oxygen to form carbon dioxide and carbon monoxide, which provides heat for the subsequent gasification reactions. Next, steam may be introduced into the gasifier 16 during a gasification step. The char may react with the carbon dioxide and steam to produce carbon monoxide and hydrogen at temperatures ranging from approximately 800° C. to 1100° C. In essence, the gasifier 16 utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 16. This resultant gas may be termed raw syngas. The gasifier 16 may also generate waste, such as slag 18, which may be a wet ash material. This slag 18 may be removed from the gasifier 16 and disposed of, for example, as road base or as another building material.

The raw syngas from the gasifier 16 may then be cleaned in a gas treatment system 20. For example, the gas treatment system 20 may separate sulfur 22 and salts 24 from the cooled raw (e.g., non-scrubbed) syngas. Subsequently, the gas from the gas treatment system 20 may include clean (e.g., scrubbed) syngas. In certain embodiments, a gas processor 26 may be utilized to remove residual gas components 28 from the clean (e.g., scrubbed) syngas, such as ammonia, methanol, or any residual chemicals. In addition, in certain embodiments, a carbon capture system 30 may remove and process the carbonaceous gas (e.g., carbon dioxide that is approximately 80-100 percent pure by volume) contained in the syngas. The scrubbed syngas may be then transmitted to a combustor 32, e.g., a combustion chamber, of a gas turbine system 34 as combustible fuel.

The power plant 10 may further include an air separation unit (ASU) 36. The ASU 36 may operate to separate air into component gases by, for example, distillation techniques. The ASU 36 may separate oxygen from the air supplied to it from an ASU compressor 38, and the ASU 36 may transfer the separated oxygen to the gasifier 16. Additionally, the ASU 36 may transmit separated nitrogen to a diluent gaseous nitrogen (DGAN) compressor 40.

The DGAN compressor 40 may compress the nitrogen received from the ASU 36 at least to pressure levels equal to those in the combustor 32 of the gas turbine system 34, for proper injection into the combustor chamber. Thus, once the DGAN compressor 40 has adequately compressed the nitrogen to a proper level, the DGAN compressor 40 may transmit the compressed nitrogen to the combustor 32 of the gas turbine system 34. The nitrogen may be used as a diluent to facilitate control of emissions, for example.

The gas turbine system 34 may include a turbine 42, a drive shaft 44 and a compressor 46, as well as the combustor 32. The combustor 32 may receive fuel, such as syngas, which may be injected under pressure from fuel nozzles. This fuel may be mixed with compressed air as well as compressed nitrogen from the DGAN compressor 40, and combusted within combustor 32. This combustion may create hot pressurized combustion gases. The combustor 32 may direct the combustion gases towards an inlet of the turbine 42. As the combustion gases from the combustor 32 pass through the turbine 42, the combustion gases force turbine blades in the turbine 42 to rotate the drive shaft 44 along an axis of the gas turbine system 34. As illustrated, drive shaft 44 is connected to various components of the gas turbine system 34, including the compressor 46. The drive shaft 44 may connect the turbine 42 to the compressor 46 to form a rotor. The compressor 46 includes blades coupled to the drive shaft 44. Thus, rotation of turbine blades in the turbine 42 causes the drive shaft 44 connecting the turbine 42 to the compressor 46 to rotate blades within the compressor 46. This rotation of blades in the compressor 46 causes the compressor 46 to compress air received via an air intake in the compressor 46. The compressed air may then be fed to the combustor 32 and mixed with fuel and compressed nitrogen to allow for higher efficiency combustion. The drive shaft 44 may also be connected to a first load 48, which may be a stationary load, such as an electrical generator for producing electrical power, for example, in a power plant. Indeed, the first load 48 may be any suitable device that is powered by the rotational output of the gas turbine system 34.

The power plant 10 also may include a steam turbine engine 50 and a heat recovery steam generation (HRSG) system 52. The steam turbine engine 50 may drive a second load 54. The second load 54 may also be an electrical generator for generating electrical power. However, both the first and second loads 48, 54 may be other types of loads capable of being driven by the gas turbine system 34 and steam turbine engine 50, respectively.

Additionally, heated exhaust gas from the gas turbine system 34 may be transported into the HRSG 52 and used to heat water and produce steam used to power the steam turbine engine 50. Exhaust from, for example, a low-pressure section of the steam turbine engine 50 may be directed into a condenser 56. The condenser 56 may utilize a cooling tower 58 to exchange heated water for cooled water. The cooling tower 58 acts to provide cool water to the condenser 56 to aid in condensing the steam transmitted to the condenser 56 from the steam turbine engine 50. Condensate from the condenser 56 may, in turn, be directed into the HRSG 52. Again, exhaust from the gas turbine system 34 may also be directed into the HRSG 52 to heat the water from the condenser 56 and produce steam.

The illustrated industrial plant 10 of FIG. 1 includes a variety of different systems and components that perform different tasks, such as the fuel source 12, the gasifier 16, the gas treatment system 20, the carbon capture system 30, gas turbine system 34, the heat recovery steam generator 52, the steam turbine engine 50, and so forth. These components may be coupled to a plurality of instrumentation 60 (e.g., sensors, controllers, actuators, etc.) that exchange signals or data regarding conditions, attributes, and actions of the respective components. The instrumentation 60 may be configured to monitor a plurality of parameters related to the operation and performance of the components. For example, one of the plurality of instrumentation 60 may be coupled to the gas turbine system 34. The instrumentation 60 may measure, for example, environmental conditions, such as ambient temperature and ambient pressure, as well as a plurality of engine parameters related to the operation and performance of the gas turbine system 34, such as exhaust gas temperature, rotor speed, engine temperature, engine pressure, gas temperature, engine fuel flow, vibration, clearance between rotating and stationary components, compressor discharge pressure, exhaust emissions/pollutants, and turbine exhaust pressure. Further, the instrumentation 60 may also measure actuator information such as valve position, and a geometry position of variable geometry components (e.g., air inlet). The instrumentation 60 may also act as a controller, controlling certain aspects of the respective component according to received control signals. Measurements taken by the instrumentation 60 may be transmitted via a control network 62 and received by a plant control system 64. Likewise, data, such as control signals, from the plant control system 64 may be transmitted to the instrumentation 60.

The plant control system 64 may be a control station or computer which includes a distributed control system (DCS) 66, a manufacturing execution system (MES 68), a human machine interface (HMI) system 70, and/or a supervisor control and data acquisition (SCADA) system 72. The plant control system 64 may also employ several types of control systems, such as a multivariable control system, an H infinite control system, an H2 control system, a linear quadratic regulator, a linear quadratic Gaussian control system, and so forth. The HMI system 70 may include a display and interface system, which may enable an operator to interact with the plant control system 64 and other plant components. For example, the display and interface system may include screens suitable for entering information and displaying a variety of data. In certain embodiments, the display and interface system may enable remote access to the various components of the plant 10, such as intranet, and internet or web access.

Additionally, in one embodiment, the control system 64 may be coupled to an advisory system 76. In another embodiment, the advisory system 76 may be included in the control system 64 as a subsystem of the control system 64. Further, the control system 64 may include a triple modular redundant (TMR) controller configured to provide redundant control operations by using three processing cores. The advisory system 76 may receive data from the control system 64 to perform certain calculations to produce control or maintenance related advisories. The advisory system 76 may provide recommended control actions and/or optimal maintenance schedules based on a plurality of data, including current plant data, historic plant data, environmental factors and forecasts, market factors and forecasts, and so forth. Such data and the manipulating of such data to obtain the advisories will be discussed in further detail below. The advisory system 76 may output recommended manual control actions to operators and/or automatically implement control parameters by sending a signal via a channel 74 to the control system 64, which may then send appropriate control signals to the instrumentation 60. The manual control actions may be communicated to the operator, for example, through alerts, alarms, and messages. This communication may include textual information and multimedia (e.g., images, videos, 3D views, audio) descriptive of the recommended control action. The advisory system 66 may be implemented as a single computing device at the plant site or remotely, or the advisory system 76 may be a plurality of computing devices accessible from different locations.

Figure 2:
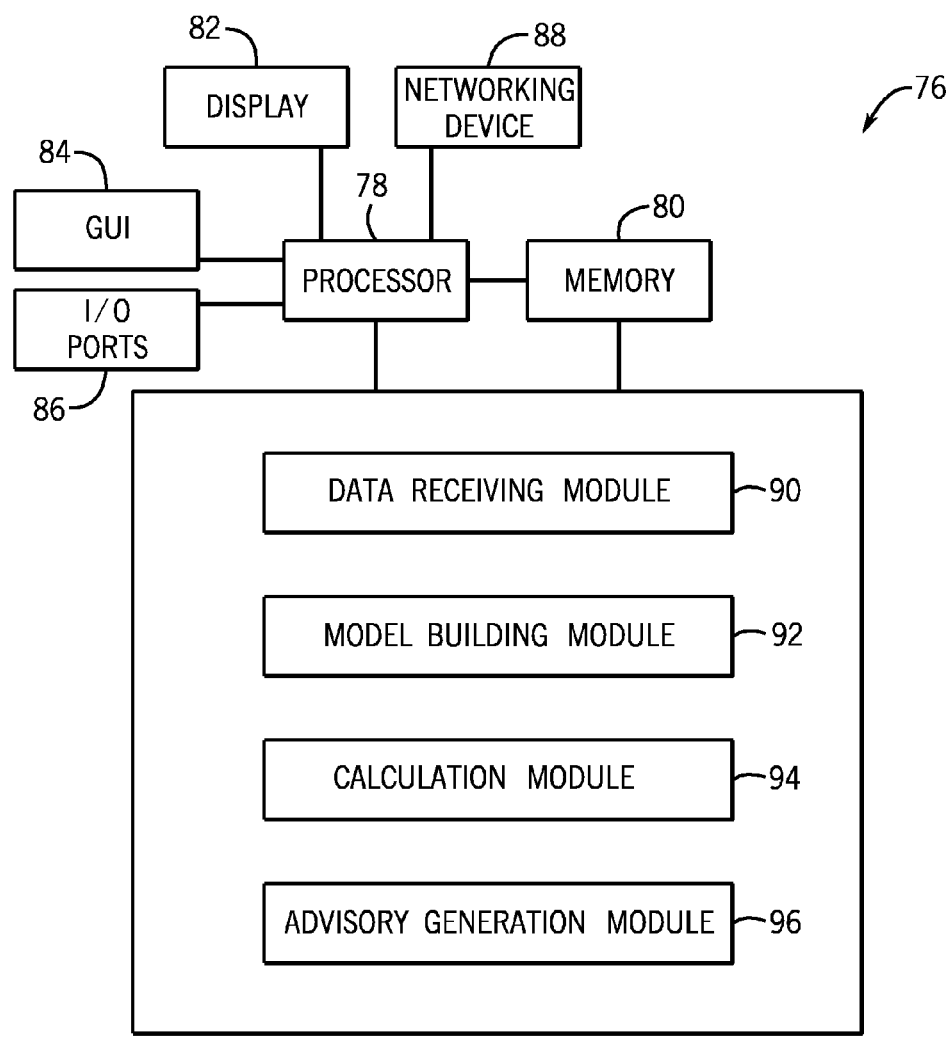
FIG. 2 is a schematic diagram of an embodiment of the advisory system of FIG. 1, in accordance with aspects of the present disclosure.

FIG. 2 is a schematic representation of an embodiment of the advisory system 76. The advisory system 76 may include a processor 78, a memory 80, a display 82, a graphical user interface 84, one or more I/O ports 86, and a networking device 88. The processor 78 may be configured to execute non-transient machine readable code (e.g., computer instructions) to carry out calculations, decisions, data processing, and communications associated with operation of the advisory system 76. Such code may be included in the memory 80. The memory 80 may include volatile memory, non-volatile memory, random access memory (RAM), read only memory (ROM), and so forth. The memory 80 may also store a plurality of data, including historic plant data, business and environmental data, physics data, and so forth. The advisory system 76 may further include several modules, including a data receiving module 90, a model building module 92, a calculation module 94, and an advisory generation module 96.

The data receiving module 90 may receive current plant data from the instrumentation 60 as well as any stored data from the memory, such as historic plant data and technical and commercial data, environmental data, degradation data, optimization criteria, regulatory data, and so forth. In certain embodiments, the data receiving module 90 may be configured to download certain data, such as commercial data (e.g., energy market data, energy futures data, fuel market data, fuel futures data), environmental data (e.g., "green" credits data, cap emissions data), regulatory data (e.g., allowed emissions data, fines, regulatory compliance cost) degradation data (e.g., aging, wear and tear, maintenance logs, inspection logs), and optimization criteria, from a network or database. Such data may be subject to frequent updates.

As previously mentioned, the advisory system 76 may use several types of data to generate loss-based control advisories. The current plant data, which may be received from the instrumentation 60, may include measurements and derivations based on the instrumentation 60. For example, the data may include temperature measurements, pressure measurements, flow measurements, clearance measurements (e.g., measuring distances between a rotating component and a stationary component), vibration measurements, position measurements, chemical measurements, power production measurements, exhaust emissions measurements, stress or strain measurements, leakage measurements, speed measurements, fuel utilization measurements, and so forth. The plant equipment data may include data related to individual equipment. For example, the data may include operating conditions of the equipment of plant 10 (e.g., speed, temperature, pressure, vibration, flow, fuel consumption, power production, clearance), maintenance history (e.g., maintenance logs), performance history (e.g., power production logs), and the like.

The business or market data may include data associated with economic and business conditions that may impact the plant 10. For example, the data may include market data for the demand and supply of electrical power, manufactured goods, fuel, raw materials (e.g., metals, chemicals), and/or processed materials (e.g., processed chemicals, refined oil). Further, the data may include data related to futures market, e.g., sales of future power output, future commodities, future raw material, and the like. Additionally, the data may include supply and demand data in regulatory markets, such as cap and trade markets (i.e., emissions markets). Further, the data may include business data related to tax credits for emission controls, tax credits for the use of certain technologies (e.g., carbon capture technologies, carbon sequestration technologies), regulatory costs related to the emissions of certain chemicals (e.g., sulfur emissions, $CO_2$ emissions), and so forth. Environmental data may include data such as weather prediction information, which also impact maintenance scheduling and the like. Power grid data may also be used, including current use, offlining of other plants 10, maintenance schedules for other plants 10, and so on.

The advisory system 76 may also employ physics related data, which take into account failure mode analysis and risk data, operational models, and physical properties and algorithms. Failure mode analysis and risk data may include data useful in deriving certain risks associated with plant operations. For example, the failure mode analysis and risk data may include physics-based models, such as low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment malfunction or the need for equipment maintenance. In conjunction with the failure mode analysis, the operational modes and physical properties may be used to simulate the operation of the power plant 10 and power plant 10 components. Accordingly, power output, fuel utilization, syngas production, HRGS 52 energy recovery, turbine 34 engine speed, and so on, may be simulated.

The failure mode analysis and risk data, and operational models may also include statistical models, such as regression analysis models, data mining models (e.g., clustering models, classification models, association models), and the like. For example, clustering techniques may discover groups or structures in the data that are in some way "similar." Classification techniques may classify data points as members of certain groups, for example, components having a higher probability of encountering an unplanned maintenance event. Regression analysis may be used to find functions capable of modeling future trends within a certain error range. Association techniques may be used to find relationship between variables. For example, using associative rule learning techniques may lead to associating certain cold start procedures with increased blade wear in a turbine system. It should be noted that the data types described above are examples of data that may be used by the advisory system 76 in determining optimal control actions and schedules. Embodiments of the advisory system 76 may utilize only a subset of the mentioned data types or include other data described herein.

The model building module 92 may be configured to use data received by the data receiving module 90 to build desired models. The models may include loss-based models suitable for computing estimated losses that each equipment of the plant 10 may experience. Each of the loss-based models generally models an amount of loss (e.g., power loss, heat loss, pressure loss, leakage, energy recovery loss) for a specific component or system of the plant 10. All equipment in the plant 10 may be thus modeled. One or more total loss models may then be built based on the individual loss models. For example, in one embodiment, the individual loss models may be combined through combinatorics, summation, transfer functions, and the like, to result in system level loss models, which may then be combined to result in a plant level total loss model.

One or more cost functions may also be modeled by the model building module 92. Each cost function may compute a cost of operating any of the equipment of the plant 10. For example, the cost (accounting, economic and/or engineering cost) for each loss-based model may be calculated. A plant level cost model may then be created as function of total system loss and critical parameters, such as cost, power, heat rates, emissions, expected demand, expected supply, regulatory costs, and so on. An empirical relation between component system loss and total system loss may also be developed, that may be a component of a plant level transfer function relating the cost function to the total system loss, fuel cost, power cost, revenue, and so on. A control algorithm may then be used to derive a more optimal control point, such as a point where the cost function is minimized, a revenue is maximized, a return on investment is maximized, or a combination thereof. The controller may then generate correction factors for control set points.

In one embodiment, the calculation module 94 uses the abovementioned models, inputs, and at least a subset of the abovementioned data to determine a more optimal control parameter. If the plant is already in an acceptable state, the calculation module may return a value indicative of such. Otherwise, the calculation module 94 may return an output corresponding to a difference between a current control parameter and a more optimal control parameter. The advisory generation module 96 may be configured to translate the output from the calculation model 94 into an operational command that may be performed by the operator or implemented automatically. As such, the advisory generation module 96 may output an advisory to the operator via a display. The advisory generation module 96 may also produce an improved operational and/or maintenance schedule, which is provided to the operator. For example, a maintenance schedule may include actions such as inspecting plant equipment, replacing certain components, performing equipment tests, and so forth. Likewise, an operational schedule may include time-based actions useful in, for example, starting up or shutting down plant operations and/or equipment. For example, a turbine startup may include a schedule of operational actions based on delivering fuel, igniting the fuel, and controlling the delivery of fuel and air so as to reach a certain turbine speed. The outputs of the advisory generation module 96 may be presented to the operator on the display 82. The operator may then implement certain recommended control actions via the GUI 84. The outputs may also be transmitted to other control stations or devices via the networking device 88, which may include a wireless router, a modem, an Ethernet card, a gateway, or the like. The outputs may also be communicated via the communication channel 74.

Figure 3:
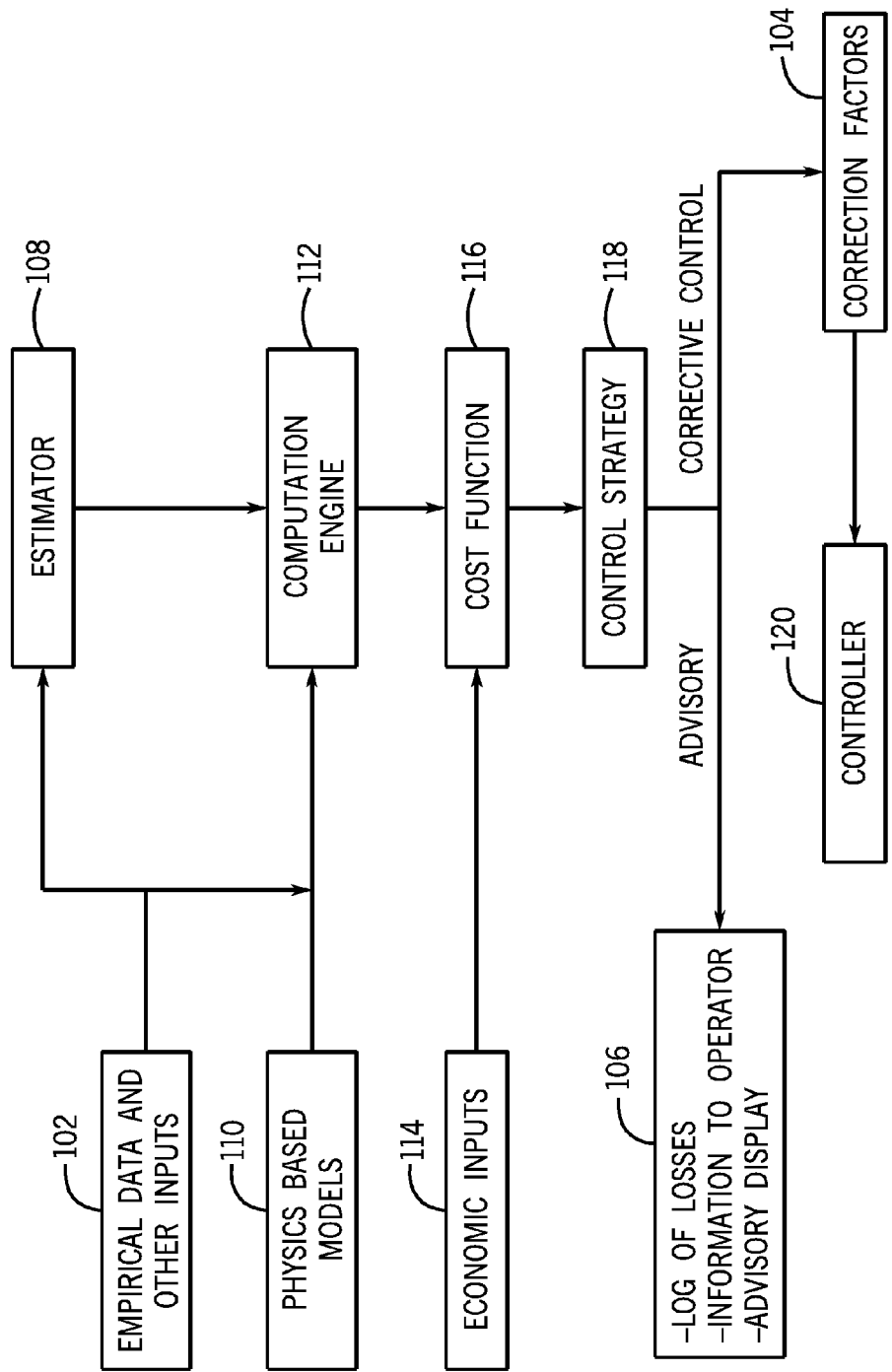
FIG. 3 is a block diagram illustrating an embodiment of a system useful in optimizing the power plant of FIG. 1, in accordance with aspects of the present disclosure.

FIG. 3 is a block diagram representation of an embodiment of the advisory system 76, by which data 102 may be used to produce automated correction factors 104 and operator advisories 106. The data, as discussed, may include current plant data, historical plant data, physics data, business and market data, environmental data, and so forth. The data may also include empirical data, such as temperatures, flows, valve positions, fuel type, rotor speed, clearance, pressures, requested power output, and so on. In some circumstances, the data 102 may be provided to an estimator system 108. The estimator system 108 may provide an estimate of certain measurements that may be more difficult to measure directly. For example, the HRSG 52 may include a steam receiving inlet having a diameter in excess of 1, 5, 10, 15 feet, which may result in flow measurements through the receiving inlet being more difficult to measure. Accordingly, the estimator system 108 may provide for an estimated measurements of HRSG flows rather than direct measurements. In other embodiments, the estimator system 108 may not be used and direct measurements may be provided.

One or more physics based models 110 may also be provided, such as physics based models derived by using the model building module 92 described in more detail with respect to FIG. 2. Indeed, all of models created by using the model building module 92 may be used. In the depicted embodiment, the data inputs 102, estimated outputs derived by the estimator system 108, and the physics based models 110 may be used by a loss computation engine 112 to compute losses for all of the components of the plant 10, such as the gas turbine 34, steam turbine 50, loads 48, 54, HRSG 52, condenser 56, cooling tower 58, ASU 36, air compressor 38, DGAN compressor 40, gasifier 16, syngas cleaning system 20, gas processor 26, carbon capture system 30, or a combination thereof. Additionally, the loss computation engine 112 may aggregate the component losses into a total system loss function. The total system loss function may generally represent losses for all components of the plant 10. That is, deviations from a rated pressure, power production, energy recovery, fuel use, energy transfer, temperature, pressure, and/or flow may be derived by the loss computation engine 112 and combined to produce the total loss for the plant 10.

Economic inputs 114 and the total loss and/or component loss may then be used by a cost model or function 116 to derive a cost of plant operations, including transient as well as steady-state operations. In one embodiment, the plant level cost model may generally determine what it costs the plant to achieve a desired output, such as the amount of power produced. The plant level cost model 116 is generally a function of certain desired outputs (e.g., power generated), operating parameters for achieving the desired output (e.g., equipment pressure, heat rate, temperature, flow rate, operating speed, emissions, cost and amount of fuel), and the losses derived by the loss computation engine 112. As such, the plant level cost model 116 may be able to determine the cost (e.g., maintenance costs, fuel costs, risks, operational costs) of producing the desired output. By incorporating real-world losses, the plant level cost model and associated submodels (e.g., physics-based models, statistical models) may improve plant 10 operations and maintenance.

The cost model 116 may include one or more objective cost functions, one or more utility cost functions, or a combination thereof, that may be mathematically optimized by finding $f(x_o) \leq f(x)$ (e.g., minima) for all x in A, where A is a set of constraints. Solvers, including but not limited to linear programming (LP) solvers, second order cone programming (SOCP) solvers, semidefinite programming (SDP) solvers, conic programming solvers, non-linear programming solvers, constraint satisfaction solvers, and/or heuristic solvers, may be used to solve the cost model 116.

In another embodiment, the cost function 116 may be mathematically optimized using the solvers described herein, by finding $f(x_o) \leq f(x)$ (e.g., maxima) for all x in A.

A control strategy system 118 may then be used to derive the advisories 106 and the correction factors 104 based on a desired control strategy. For example, in one embodiment, the control strategy may include minimizing overall costs of plant operations. Accordingly, the correction factors 104 and advisories 106 may be derived by the control strategy system 118 so that the cost function 116 returns a more minimal cost point. In another embodiment, such as when a neighboring plant 10 is out of commission due to inclement weather or other unplanned events, the control strategy system 118 may provide a control strategy that maximizes plant 10 output but may issue advisories on cost overruns and/or new maintenance schedules. The control strategy system 118 may employ an artificial intelligence (AI) and/or machine learning system to make advisory decisions based upon the output of the cost function 116 and other data. The other data may include business/market data, environmental data, regulation data, and so forth. Such data, though not based on physical conditions of the plant, may be worth considering as they may impact control decisions. For example, certain regulations may award credits or benefits to the plant or parent company if the plant emissions are below a certain threshold. However, in order to produce a target power output, the plant may emit greater emissions, and potentially lose the emissions credit. Thus, the control strategy system 118, via the AI or machine learning system may calculate the gains and losses of either scenario and make a more advantageous control decision. Additionally, the AI or machine learning system may also use historical data to facilitate its decision making. This may include updating or adjusting certain decision thresholds according to past decisions, results, and trends, as well as gaining more refined input-output causal relationships. For example, the control strategy system 118 may apply these methods in determining an more optimal plant 10 outage schedule that maximizes returns and minimizes loss.

The AI and/or machine learning systems used to carry out the abovementioned functions may include a k-nearest neighbor system (k-NN) implementing a k-NN algorithm, in which objects or situations are classified based on the closest known example, or nearest neighbor. The AI and/or machine learning system may also include an expert system, in which the expert system emulates the decision making of a human expert. The expert system may include a knowledge database, which may be expressed as a series of "if . . . then . . . " statements and the like. The expert system may also employ an inference engine to facilitate reasoning and decision making. The inference engine may include propositional logic, temporal logic, modal logic, fuzzy logic, and the like. In addition to the discussed KNN algorithm and expert system, control strategy system 118 may also use other AI and/or machine learning systems, such as a genetic algorithm, a state vector machine, fuzzy logic, neural networks, and so forth.

The results of the control strategy system 118 may include correction factors 104 that may be communicated to an industrial controller 120. Accordingly, the controller 120 may output more optimum firing temperatures, exhaust temperatures, fuel flows, pressures, speeds, valve positions, and so forth. Likewise, the result may be used to generate operator advisories 106, which may be presented to the operator in the form of an alert, alarm, or message. The operator advisories 106 may include instructions to perform a certain control action. The operator advisories 106 may also include a maintenance planner, which shows the operator the best times to make certain control or maintenance actions, some of which may involve taking the plant or certain components of the plant offline. As discussed, business and environmental data may be used to build such a schedule. For example, the techniques described herein may take into consideration expected demand, cost, profitability, weather conditions, as well as the criticality of the maintenance or outage. Additionally, historical plant data may also be used to build the schedule. Additionally, in certain embodiments, the advisories 106 may include an advisory display or interface provided through the GUI 84, with which the operator may interact to visualize and to directly implement the suggested recommendations, as described in more detail below with respect to FIG. 4.

Figure 4:
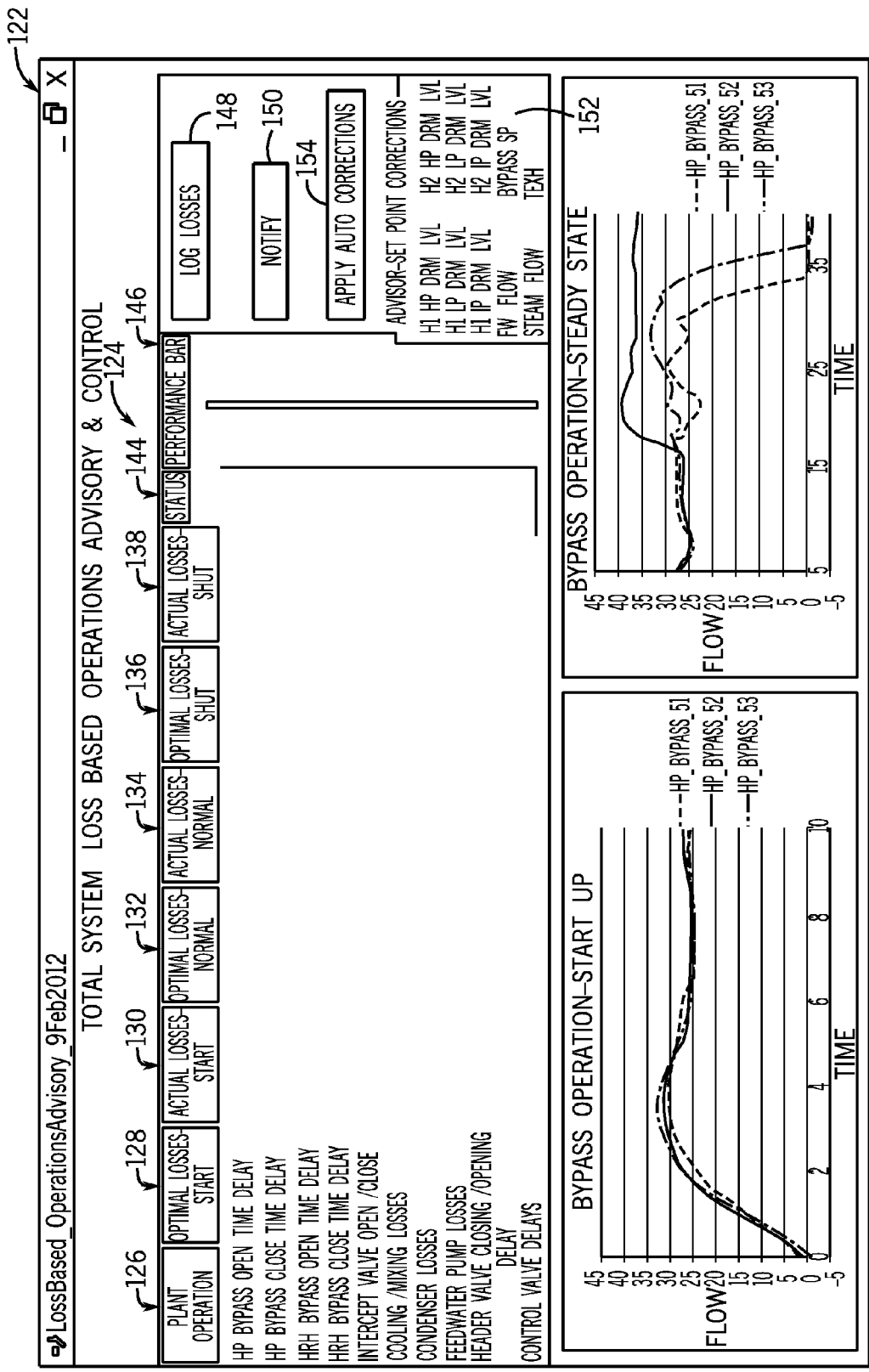
FIG. 4 is an illustration of an embodiment of a graphical user interface of the advisory system of FIG. 1, in accordance with aspects of the present disclosure.

FIG. 4 illustrates an embodiment of an interface 122 that may be displayed on the GUI 84. In this particular embodiment, the interface includes a data window 124. The data window 124 may present a plurality rows of plant operations 126 and rows of losses 128, 130, 132, 134, 136, and 138 associated with the operations 126. The losses 128 may include calculated optimal losses associated with, for example, start operations (e.g., plant 10 startup, turbine 34 startup, gasifier 16 startup, HRSG 52 startup). The losses 130 may include actual losses found during start operations. The losses 132 may include calculated optimal losses associated with, for example, steady state or normal operations. The losses 134 may include actual losses found during steady state or normal operations. The losses 136 may include calculated optimal losses associated with, for example, shutdown operations. The losses 138 may include actual losses found during shutdown operations. By providing for a visual (graphic and/or numeric) representation of losses 128, 130, 132, 134, 136, and 138 associated with the operations 126, the screen 122 may provide a more intuitive and readable visualization of plant 10 losses.

More detailed graphical views, such as charts 190 and 192 may also be provided. For example, the user may select one or more of the operations 126 and the charts 190 and 192 may then be dynamically displayed to present detailed graphical views associated with the selected operations 126. For example, chart 190 may present detailed graphical data of start up losses associated with the selected operations 126, while chart 192 may present detailed graphical data of steady state losses associated with the selected operations 126. Status information 146 for the operations 126 may also be presented, along with a performance bar 146 detailing performance metrics for the operations 126.

A button 148 or other suitable mechanism may be provided to store or log the data presented by the interface 122. Likewise, a button 150 or other suitable mechanism may be provided to send notifications (e.g., email, instant message, cell phone call, short message service [SMS] notification) of the data presented by the interface 122. Set point corrections 152 may also be presented, detailing certain corrections advised by the control strategy system 118. Accordingly, a button 154 or other suitable mechanism may be provided to automatically enter the set point corrections 152, for example, into the controller 120 to be acted upon by the controller 120.

Figure 5:
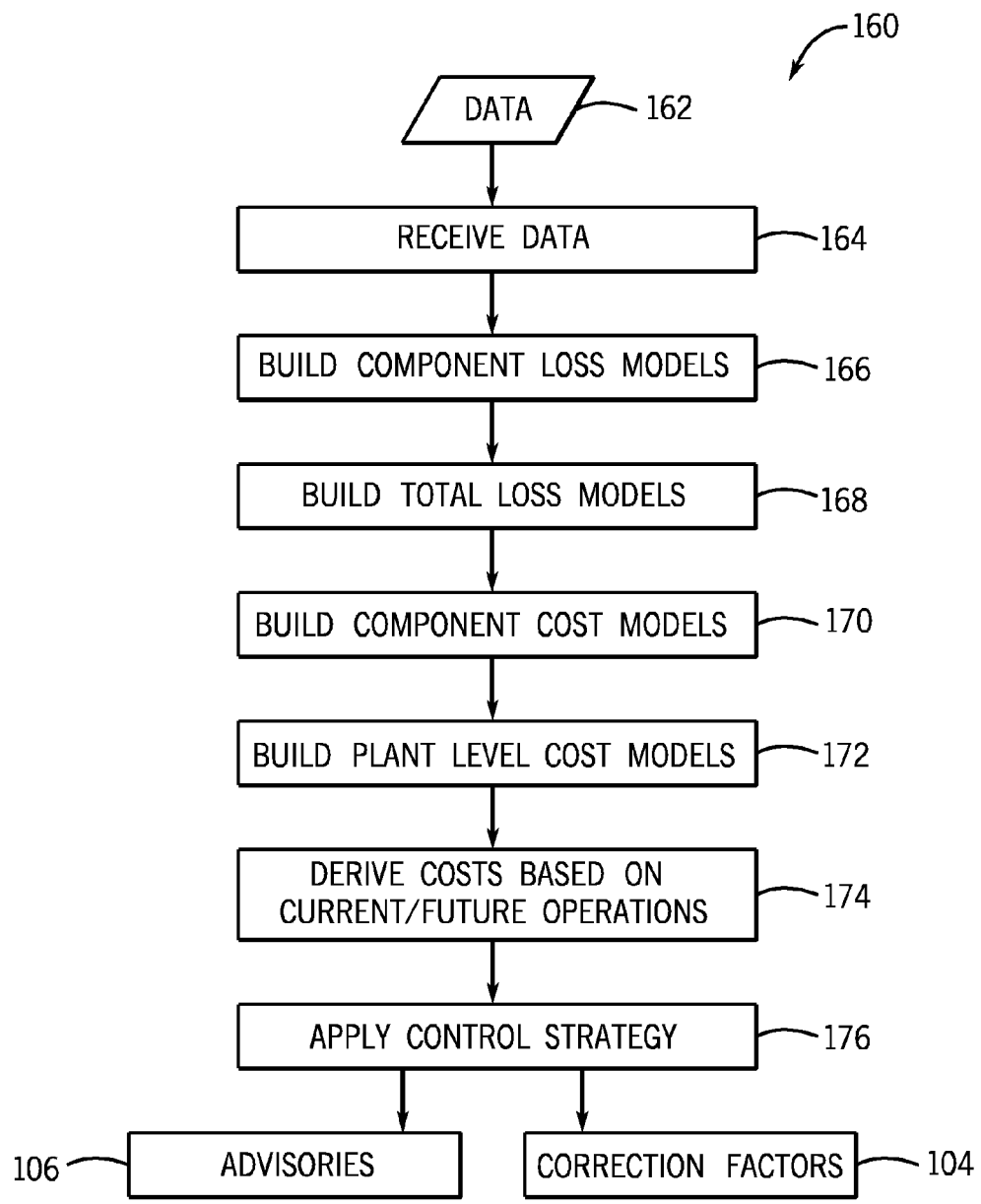
FIG. 5 is a flow chart illustrating an embodiment of a process useful in improving performance of the power plant of FIG. 1, in accordance with aspects of the present disclosure.

FIG. 5 illustrates a process 160 that may be employed by the plant 10, and in certain embodiments, by the controller 120 and/or the advisory system 76. The process 160 may be implemented as non-transient machine readable code (e.g., computer instructions) to carry out calculations, decisions, data processing, and communications for the process 160 and executable by the controller 120 and/or the advisory system 76. The process 160 may receive (block 164) data 162 from various sources. The data 162 may include current plant data, which may come from the instrumentation 60 (FIG. 1), historical plant data, business and environmental data, optimization criteria, physics data, and so forth. Some data may be received from the memory 80 and/or be downloaded from a network or database located on another machine. After the appropriate data is received (block 164), the data 162 may be used to derive (block 166) component level loss models. As mentioned above, physics-based models, statistical models, and/or heuristic models may be used to model a component's loss based on inputs such as component age, inspection data, maintenance records, fleet historical records, and so on.

The component loss models may be combined to build (block 168) one or more total loss models, such as plant total loss models. Accordingly, the total loss of transient and/or steady state operations for the plant 10 may be derived by the techniques described herein. The process 160 may then build (block 170) component cost models or functions, incorporating, for example, commercial data (e.g., energy market data, energy futures data, fuel market data, fuel futures data), environmental data (e.g., "green" credits data, cap emissions data), and/or regulatory data (e.g., allowed emissions data, fines, regulatory compliance cost). One or more plant level cost models may also be built (block 172). For example, the component cost models may be aggregated into a plant level model that may more accurately derive a cost for transient and steady state operations of the plant 10.

Accordingly, costs, such as plant level costs and component level costs, may be derived (block 174) during operations. The operations may include steady state operations (e.g., normal operations), and/or transient operations (e.g., startup, shutdown, trip). Based on the derived costs, a control strategy may be applied (block 176). For example, the control strategy may attempt to minimize costs, maximize profit, maximize return on investment, maximize production, and so forth. The correction factors 104 may then be issued, for example, to the controller 120, to automate the control strategy. Additionally or alternatively, the advisories 106 may be provided, useful in advising courses of action so that plant operators may more efficiently operate the plant 10.

By way of example only, an air inlet system pressure loss may reduce gas turbine 34 power and heat rate, and may be expressed as $\Delta P = f \times (Lift/Drag) \times (V \times V/(2 \times g))$, where V is air input (e.g., velocity) to a gas turbine duct and g is gravity. Similarly, pressure loss for a gas turbine exhaust system may be a function of reference temperature and air temperature as well as respective velocity squares. Feed-water system losses may be derived as described below.

For a feed-water system including a heater and a pump providing water or steam to intermediate pressure (IP) and high pressure (HP) sections of the HRSG 52, HP/IP economizer hot exhaust gases may pass through feed-water output and may be delivered to HP/IP drums. The feed-water pump may have pumping losses and pressure losses, expressed as Pump efficiency=$(P2-P1)/rho \times (h2-h1)$ where P1 is first pressure, P2 is second pressure, rho is a density measure, and h1 is a first pressure head and h2 is a second pressure head. Accordingly, pressure loss=Pump efficiency×(rho× (h2−1h1)). Given that Terminal Temperature difference (TTD)=saturation temperature−feedwater outlet temperature, and Drain Cooler Approach (DCA) Temp diffeference=Drain outlet temp−FW inlet temp, and Temperature rise (TR)=FW outlet temp−FW inlet temp, then TTD may be an indicator of an amount of heat transfer and DCA may be an indicator of fluid leakage, crack in baffles, or other losses.

By measuring steam extraction temperature, inlet flows, outlet temperatures, pressures and flows, we can calculate the above parameters for the plant 10 or any system included in the plant 10. Thus, a Total System Loss (e.g., for Feedwater system, Inlet system, and exhaust system only)=[k1× Pump efficicency+k2×TTD+k3×DCA+k4×TR+k5×ΔP inlet+k6×ΔP exh], where k1 . . . k6 are factors of importance that is dependent on time of day, season, transient or steady state, etc. One can then define thresholds for TTD, DCA, TR and Pump efficiency to quantify these losses. Accordingly, a plant level cost function may be developed, including feedwater, inlet and exhaust systems, where the plant level cost function =C1×[Total System Loss]+C2×Fuel cost+C3× (Supply−Demand)+C4×(Electricity Cost), where C1 . . . C4 are weighting factors that normalize the above cost function to be minimized.

Thus, an objective function (e.g., based on the cost function) may be set up for the controller 120, such that {Objective function: Optimize (Plant level cost function):: constraints→plant/component design limits, TTD>threshold_TTD, TR<threshold_TR, DCA>threshold_DCA, ΔP>threshold_ΔP}. The controller 120 may then output flow and valve settings. These settings may in turn be mapped to exhaust temperature and exhaust flow rate values such that total system loss may remain approximately mathematically optimal for a desired plant 10 performance. The correction factors 104 may be used depending on a mode of operation. For example if the plant 10 is operating in a transient (e.g., start-up) mode, a power increase may be a primary objective, thus the controller may not honor the correction factors 104 but may instead issue advisories, including a running log of losses that may be affecting the plant's performance. If the plant 10 is in a steady state mode of operation, then the controller 120 may provide corrective action by using the correction factors 104. The techniques described herein may be used at base load, e.g., manufacturer recommended percentage of maximum continued rating or produced power, peak load, e.g., maximum recommended continued rating or produced power, part load, e.g., a load less than base load, or a combination thereof. For example, based on derived losses, the techniques described herein may choose an improved operating point at part load that is derived to consume least life either in terms of first stage temperature (e.g., if the component is a multi-stage turbine 34) and/or rate of degradation of components.

Technical effects of the invention include providing systems and methods that improve operations for an industrial plant and plant components. A total loss for plant operations, including steady state and transient operations may be derived, based on constructing a set of models (e.g., physics-based models, statistical models, heuristic models). One or more cost functions may then be derived, suitable for using the total loss as input and providing for a more accurate cost of plant operations. The cost function may then be used to find a more optimal operating strategy, and advisories and control actions may be issued based the operating strategy. Thus, the systems and methods enable plants to be controlled in a more efficient manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a controller comprising a processor configured to execute:
an advisory system comprising:
a loss computation engine configured to derive a total system loss for an industrial plant based at least on a first sensor positioned in a first industrial plant component comprising a gas turbine system configured to combust a fuel to provide a power and on a first physical model of the first industrial plant component;
a cost model configured to use a cost function to derive a cost based on the total system loss; and
a control strategy system configured to derive a control correction factor automatically based on the cost, wherein a control system is configured to automatically apply the control correction factor to control a process in the industrial plant, wherein the cost function comprises at least one objective function comprising a cost of producing power for the industrial plant, wherein the advisory system is configured to display a startup operation loss comprising a flow of fluid versus a time based on the total loss.

2. The system of claim 1, wherein the total system loss comprises a loss due to age, degradation, an unplanned event, a planned event, an unplanned maintenance, a planned maintenance, or a combination thereof.

3. The system of claim 2, wherein the degradation comprises a comparison between a sensor reading and an International Organization for Standardization (ISO) rated value.

4. The system of claim 1, wherein the first sensor comprises a temperature sensor, a flow rate sensor, a pressure sensor, a fuel utilization sensor, a chemical analysis sensor, a speed sensor, a clearance sensor, or a combination thereof.

5. The system of claim 1, comprising an estimator system executable by the processor and configured to derive an estimated measure for a flow, a pressure, a speed, a clearance, or a combination thereof, based on a second sensor positioned in a second industrial plant component, and wherein the loss computation engine is configured to derive the total system loss based on the first sensor and on the estimated measure.

6. The system of claim 1, wherein the first industrial plant component comprises a heat recovery steam generation (HRSG) system, a gas turbine, a steam turbine, a condenser, a gasifier, a syngas cleaning system, a carbon capture system, a valve, a pump, a compressor, a cooler or a combination thereof.

7. The system of claim 1, wherein the cost of producing power for the industrial plant comprises an engineering cost and an economic cost of producing power during transient operations and during steady state operations of the industrial power plant.

8. The system of claim 1, wherein the controller comprises a linear programming (LP) solver, a second order cone programming (SOCP) solver, a semi-definite programming (SDP) solver, a conic programming solver, a non-linear programming solver, a constraint satisfaction solver, a heuristic solver, or a combination thereof, suitable for solving the cost function.

9. The system of claim 1, wherein the advisory system comprises a k-nearest neighbor (k-NN) system, an expert system, a neural network, a genetic algorithm (GA), a state vector machine, or a combination thereof.

10. The system of claim 1, wherein the industrial plant comprises a turbine system having a first combustor stage, and wherein the control strategy system is configured to choose an operating point at part load of the turbine system that is derived to consume less turbine life based on a first combustor stage temperature, rate of degradation of components of the turbine system, or a combination thereof.

11. A method, comprising:
creating, via a first processor, a first component loss model configured to derive a first loss for a first component of an industrial plant;
creating, via the first processor, a second component loss model configured to derive a second loss for a second component of the industrial plant;
combining, via the first processor, the first and second loss models into a total loss model configured to model a total loss;
receiving from a first sensor a first data related to operations of the first component, and from a second sensor a second data related to operations of the second component via a controller;
computing, automatically via the controller, the total loss using the first and second data as inputs to the total loss model, wherein the total loss model comprises a cost function comprising at least one objective function comprising a cost of producing power for the industrial plant;
displaying via a user display a startup operation loss comprising a flow of fluid versus a time based on the total loss; and
deriving and applying automatically via the controller, a control correction factor to control a process in the industrial plant.

12. The method of claim 11, comprising:
building, via the first processor, a first cost model configured to derive a first cost for operations of the first component by using the first loss;
building, via the first processor, a second cost model configured to derive a second cost for operations of the second component by using the second loss;
combining, via the first processor, the first and second cost models into a total cost model configured to derive a total cost based on a commercial input; and
deriving, via the controller, the total cost.

13. The method of claim 11, wherein cost of producing power for the industrial plant comprises an engineering cost and an economic cost of producing power during transient operations and during steady state operations of the industrial power plant.

14. The method of claim 13, comprising applying, via the controller, a mathematical optimization to the objective cost function to derive the total cost.

15. The method of claim 13, comprising using, via the controller, a linear programming (LP) solver, a second order cone programming (SOCP) solver, a semi-definite programming (SDP) solver, a conic programming solver, a non-linear programming solver, a constraint satisfaction solver, a heuristic solver, or a combination thereof, to solve the objective function.

16. A system comprising:
a memory comprising non-transitory, computer-readable medium comprising code configured to:

create, via a first processor, a first component loss model configured to derive a first loss for a first component of an industrial plant;

create, via the first processor, a second component loss model configured to derive a second loss for a second component of the industrial plant;

combine, via the first processor, the first and second loss models into a total loss model configured to model a total loss;

receive, from a first sensor, a first data related to operations of the first component, and from a second sensor a second data related to operations of the second component via a controller;

compute automatically via the controller the total loss using the first and second data as inputs to the total loss model, wherein the total loss model comprises a cost function comprising at least one objective function comprising a cost of producing power for the industrial plant;

display via a user display a startup operation loss comprising a flow of fluid versus a time based on the total loss; and derive and apply automatically via the controller, a control correction factor to control a process in the industrial plant.

17. The system of claim 16, wherein the code comprises code configured to:

build, via the first processor, a first cost model configured to derive a first cost for operations of the first component by using the first loss;

build, via the first processor, a second cost model configured to derive a second cost for operations of the second component by using the second loss;

combine, via the first processor, the first and second cost models into a total cost model configured to derive a total cost based on a commercial input; and derive, via a controller, the total cost.

18. The system of claim 16, wherein the code comprises code configured to apply via a controller a mathematical optimization to the objective cost function to derive the total cost.

19. The system of claim 16, wherein the code comprises code configured to use via a controller a linear programming (LP) solver, a second order cone programming (SOCP) solver, a semi-definite programming (SDP) solver, a conic programming solver, a non-linear programming solver, a constraint satisfaction solver, a heuristic solver, or a combination thereof, to solve the objective function.

* * * * *